United States Patent
Cahill et al.

(10) Patent No.: US 9,921,172 B2
(45) Date of Patent: Mar. 20, 2018

(54) SEGMENTED FIBER NUCLEAR LEVEL GAUGE

(71) Applicant: Vega Americas, Inc., Cincinnati, OH (US)

(72) Inventors: Bonaventure Cahill, Crestview Hills, KY (US); Thomas Niinemets, Cincinnati, OH (US)

(73) Assignee: Vega Americas, Inc., Cincinnati, OH (US)

( * ) Notice: Subject to any disclaimer, the term of this patent is extended or adjusted under 35 U.S.C. 154(b) by 0 days.

(21) Appl. No.: 13/798,179

(22) Filed: Mar. 13, 2013

(65) Prior Publication Data

US 2014/0264040 A1    Sep. 18, 2014

(51) Int. Cl.
  G01T 1/202    (2006.01)
  G01N 23/08    (2006.01)
  G01T 1/20     (2006.01)

(52) U.S. Cl.
  CPC ............. *G01N 23/08* (2013.01); *G01T 1/202* (2013.01); *G01T 1/2006* (2013.01)

(58) Field of Classification Search
  CPC .. G01F 23/288; G01F 23/284; G01F 23/2885; G01F 25/0061; G01T 1/202; G01T 1/20; G01T 1/201
  USPC ....................................................... 250/362
  See application file for complete search history.

(56) References Cited

U.S. PATENT DOCUMENTS

| 4,471,223 | A | | 9/1984 | Hurst et al. | |
|---|---|---|---|---|---|
| 5,331,163 | A | | 7/1994 | Leahey et al. | |
| 5,331,961 | A | * | 7/1994 | Inaba et al. | 600/436 |
| 5,629,515 | A | * | 5/1997 | Maekawa | 250/207 |
| 5,774,515 | A | * | 6/1998 | Fujiwara et al. | 376/254 |
| 6,078,052 | A | * | 6/2000 | DiFilippo | G01T 1/202 250/367 |
| 2006/0138330 | A1 | * | 6/2006 | Baldwin et al. | 250/357.1 |
| 2011/0192979 | A1 | * | 8/2011 | Cahill | 250/362 |

FOREIGN PATENT DOCUMENTS

| DE | 20 08 411 A1 | 9/1971 |
|---|---|---|
| EP | 0 060 630 A2 | 9/1982 |
| WO | 00/22387 A1 | 4/2000 |

OTHER PUBLICATIONS

PCT/US2014/022366, Vega Americans, International Search Report and Written Opinion, dated Dec. 5, 2014.

* cited by examiner

*Primary Examiner* — Marcus Taningco
(74) *Attorney, Agent, or Firm* — Wood Herron & Evans LLP

(57) ABSTRACT

A nuclear level sensing gauge for measuring the level of product in a bin utilizes a plurality of scintillators arranged in a serial fashion. A source of nuclear radiation is positioned adjacent the bin, and the scintillators, which may be bundles of one or more scintillating fibers or scintillating crystals, are positioned in a serial fashion adjacent the bin opposite the source of nuclear radiation, such that nuclear radiation passing through the bin impinges upon the bundles. Light guides carry photons emitted by the scintillators—which are indicative of radiation passing through the bin—to a common photomultiplier tube. The tube is connected to electronics which convert counts of photons from the PMT into a measure of the level of radiation-absorbing product in the bin.

20 Claims, 6 Drawing Sheets

SEGMENTED FIBER NUCLEAR LEVEL GAUGE

BACKGROUND OF THE INVENTION

In many industrial environments, it is necessary to detect the level of product in a holding tank or bin. Level sensors are typically attached to the holding tank or bin, and electrically connected to remote gauges at a control room or other central location, where technicians or control systems may monitor the status of the bins to provide the appropriate process control.

Various technologies have been developed for level sensing. These include various contact sensing technologies using floats or drop weights, as well as various non-contact technologies such as reflecting electromagnetic radiation or ultrasonic vibrations from the surface of the product in the bin to determine the height of the product.

In some applications, it is particularly important to move the sensor away from the product. For example, in a foundry where the level of a hot melt of steel or ore is to be level sensed, it is particularly important to keep the level sensor a safe distance from the hot melt. In these applications, nuclear level sensing gauges are used.

In a nuclear level sensing gauge, a source of nuclear radiation is positioned on one side of the bin to be level sensed. A nuclear radiation detector is placed on the opposite side of the bin. The radiation exiting the source is in the shape of a wide generally vertically dispersed beam, directed toward the interior of the bin. The product in the bin substantially absorbs the radiation that impinges upon it. If, however, the bin is not full of product, some part of the beam of radiation from the source passes through the bin and exits from the bin on the side opposite to the radiation source, and irradiates the radiation detector. Because the product in the bin substantially absorbs the radiation that impinges upon it, thus reducing the amount of the radiation beam passing through the bin, the amount of radiation stimulating the radiation detector, is inversely proportional to the amount of product to the bin. Thus, the amount of radiation detected by the radiation detector, is compared to minimum and maximum values to produce a measurement of the amount of product in the bin.

FIG. 1 illustrates a typical prior art nuclear level sensing gauge, in which the nuclear detector is based on a scintillating crystal. An elongated scintillating crystal 14 produces photons of light when exposed to nuclear radiation from source S. The number of photons produced is related to the amount of radiation impinging on the crystal. To detect radiation passing through the bin, the scintillating crystal 14 is placed on the side of the bin opposite to the radiation source, with the long dimension of the crystal generally vertically oriented. A photomultiplier tube 12, used as a light detector, is coupled to an end of the crystal, and detects photons of light emanating from the scintillating crystal, and produces from this a signal for amplification by electronics 10, which produces an output indicative of the amount of radiation impinging on the crystal, and thus the level of product in the bin. This type of sensor is discussed in U.S. Pat. Nos. 3,884,288, 4,481,595, 4,651,800, 4,735,253, 4,739,819 and 5,564,487.

An improvement to the traditional nuclear gauge is disclosed in U.S. Pat. No. 6,198,103, filed by the assignee of this application. The '103 application discloses a nuclear level sensing gauge, seen in FIGS. 2A and 2B, which uses a bundle of one or more scintillating fibers as the radiation detector, in place of a scintillating crystal. In the version of FIG. 2A, the fibers are directly coupled to a photomultiplier tube 12, whereas in the version of FIG. 2B, the fibers are coupled to the PMT 12 via a light guide 18, which permits the PMT and amplifying electronics 10 to be positioned remotely from the fiber bundle 16.

The use of a scintillating fiber yields substantial improvements in cost, performance and ease of use and size and sensitivity configuration as compared to known gauges which use a scintillating crystal. Specifically, compared to a scintillating crystal, the scintillating fibers are light, can be easily coiled for shipment, and are easy to cut to desired lengths. Scintillating fibers can be readily curved to match the curvature of a particular bin, whereas crystals are rigid and difficult to custom manufacture. Also, scintillating fibers have better internal reflection characteristics than crystals, meaning that fiber scintillating sensors can be made longer with less loss than crystal scintillating sensors. Finally, a bundle of one or more fibers can have substantially less heat capacity than the corresponding crystal, meaning the bundle is more readily cooled.

Unfortunately, both the crystals and fibers exhibit light intensity losses when manufactured in long lengths. FIG. 3 illustrates the decay of light intensity as a function of the distance of a travel from a scintillation source through a medium, and the definition of the "attenuation length" $L(i/e)$ of a medium, which is defined as distance that light that light can be transmitted through a medium before the light intensity is reduced to $1/e$ of its intensity at its origin. A fiber bundle typically has an "attenuation length" of about 2.5 meters. As can be seen from the FIG. 3 curve of light intensity vs. distance of travel, light loss is relatively severe at distances longer than the attenuation length, and nonlinear. However, fiber bundles and crystals have been used commercially at long lengths, up to 10 feet for crystals and 12 feet or longer for bundles. Crystals are practically limited to approximately 10 foot lengths because of the difficulty of manufacturing bars in longer sizes. Fibers are not practically limited by manufacturing constraints, but are constrained by the attenuation length of the polystyrene medium used to make the fibers.

Engineers confronting the limited lengths of scintillating crystals have created serialized devices that use multiple crystals for sensing level. FIG. 4 shows a typical prior art arrangement of this kind, in which a plurality of scintillating crystals 14 are placed in serial fashion adjacent a bin opposite to the source S, each crystal stimulating a photomultiplier tube 12 which is coupled to electronic amplifiers 10. The output of the various amplifiers are then coupled to summation electronics 20. Each crystal has a length less than the attenuation length of the crystal, but the serially positioned crystals have a collective length Lt that can be substantially greater than the attenuation length, FIG. 5 shows an alternative serialized arrangement of crystals 14 that has been used in installations where it is desired to move the photomultiplier tubes 12 remote from the crystals 14; in this embodiment a light guide 18 couples light from each crystal 14 to each PMT 12. As in FIG. 4, the crystals are generally cut to a length less than the attenuation length, but have a collectively length Lt that can be substantially longer.

Unfortunately, the solutions illustrated in FIGS. 4 and 5 suffer from high complexity and cost, due to the replication of the PMT 12 and electronics 10 and the requirement for a summation electronics unit 20, rendering this form of gauge uncompetitive with a single fiber bundle in many environments; however, as noted, a fiber bundle suffers from attenuation losses at long lengths.

Accordingly, there is a need for an improved scintillating nuclear level sensing gauge which address the shortcomings of the existing products.

SUMMARY OF THE INVENTION

The needs are met according to the invention, which provides a new and improved nuclear gauge which is not limited by the attenuation length of the scintillator and yet does not suffer from undue complexity or excessive cost.

A nuclear level sensing gauge according to principles of the present invention uses a plurality of scintillators, positioned in a serial fashion adjacent the product in the bin opposite the nuclear source, and uses light guides to couple light from those scintillators to a common light sensor, so that the common light sensor detects light generated in two more scintillators. The number of photons generated in the scintillators is thus measured by a single common light sensor, producing a measure of level of radiation-absorbing product in the bin without the cost and complexity of multiple photomultiplier tubes and amplifying electronics as are used in the prior art with multiple scintillators.

In the described particular embodiments, the scintillator comprises either a bundle of scintillating fibers (e.g., 300 fibers in a bundle of 1 inch diameter) or a scintillating crystal. In either case, each scintillator may be limited to under the attenuation length, e.g., less than approximately 4 feet in length. The light sensor may be a photomultiplier tube, or in high radiation applications, the light sensor may be an array of photodiodes.

The objects and advantages of the present invention shall be made further apparent from the accompanying drawings and the description thereof.

DETAILED DESCRIPTION

Figure 6:
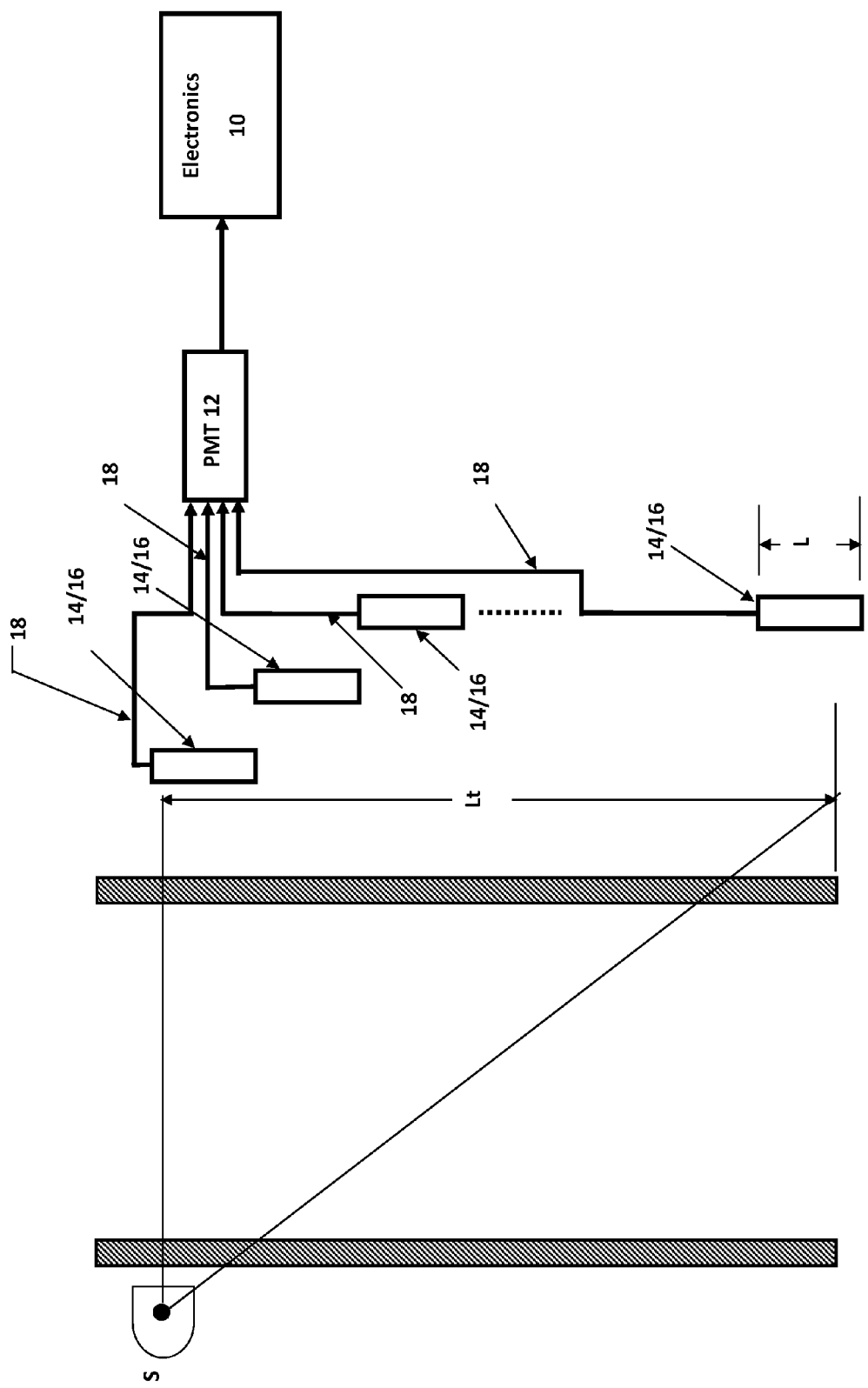
FIG. 6 illustrates a fiber bundle nuclear level sensing gauge using a plurality of fiber bundles arranged with light guides coupling photons to a common photomultiplier tube and amplifying electronics.

FIG. 6 shows a level sensing gauge in accordance with the present invention. In this gauge, plural scintillators 14/16 are arranged in a serial fashion to detect radiation passing through the bin. These scintillators may be crystals or fiber bundles (e.g., bundles of greater than 300 fibers in a 1 inch diameter bundle), or may be a mixture of crystals and fiber bundles, as suits a particular application. Importantly, the scintillators can be sized so that none is longer than the attenuation length of the scintillator medium.

Figure 1:
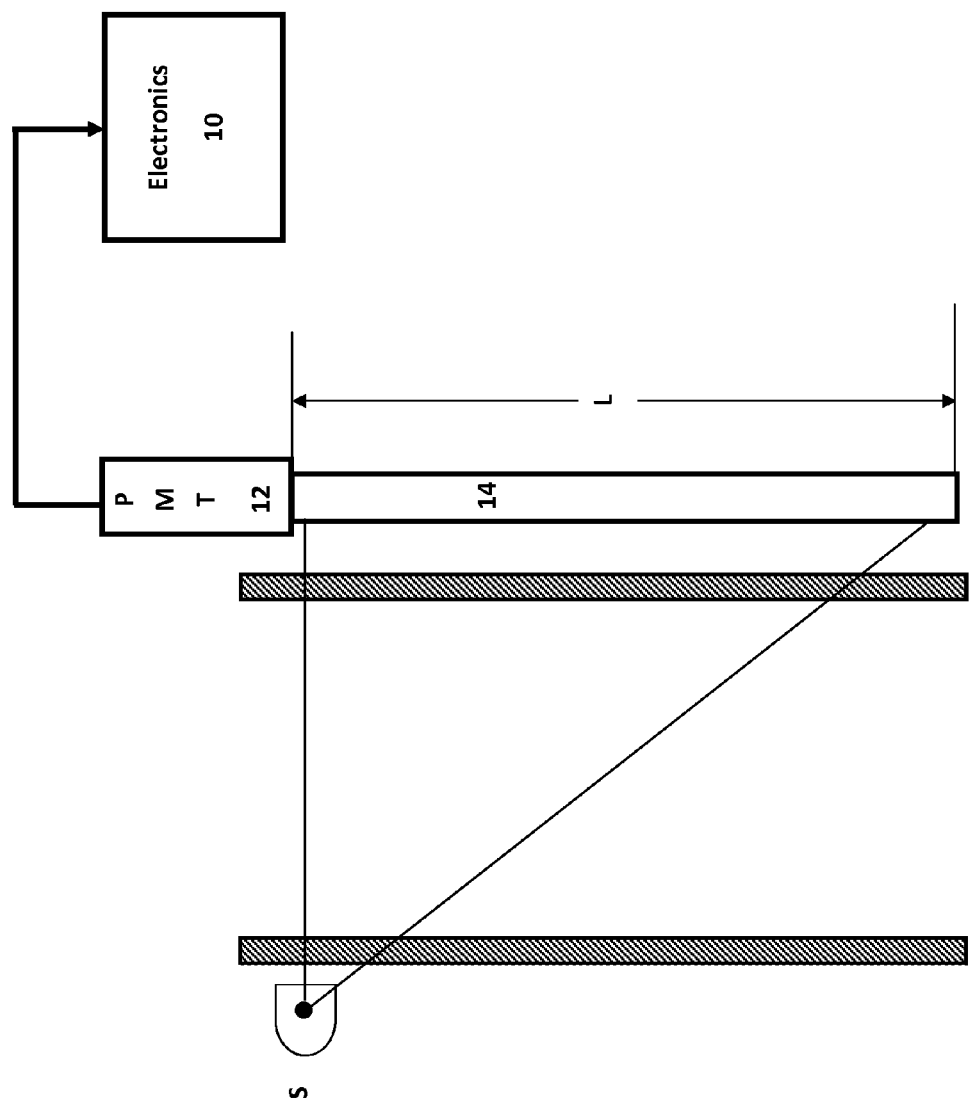
FIG. 1 illustrates a prior art nuclear level sensing gauge using a scintillating crystal.
Figure 2A:
FIG. 2A illustrates a prior nuclear level sensing gauge using a bundle of scintillating fibers.
Figure 2B:
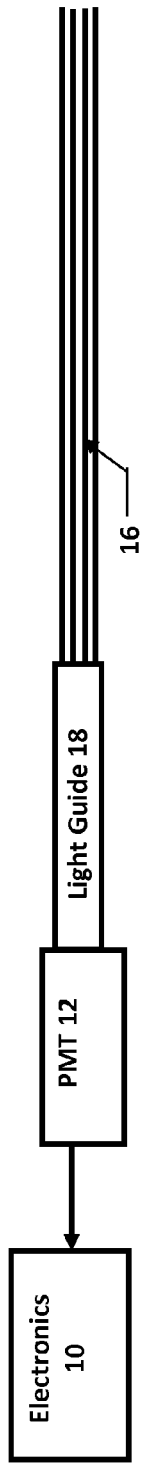
FIG. 2B illustrates an alternate version of such a gauge using light guides.
Figure 3:
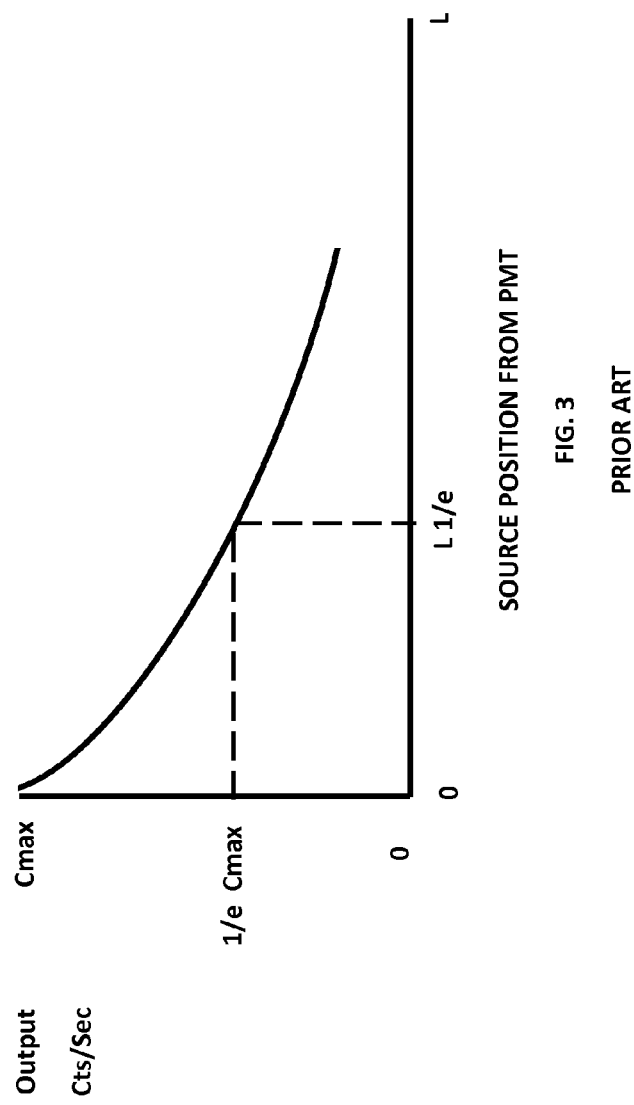
FIG. 3 illustrates the loss of light intensity through a medium as a function of distance from the light source, and the definition of the attenuation length L(1/e)
Figure 4:
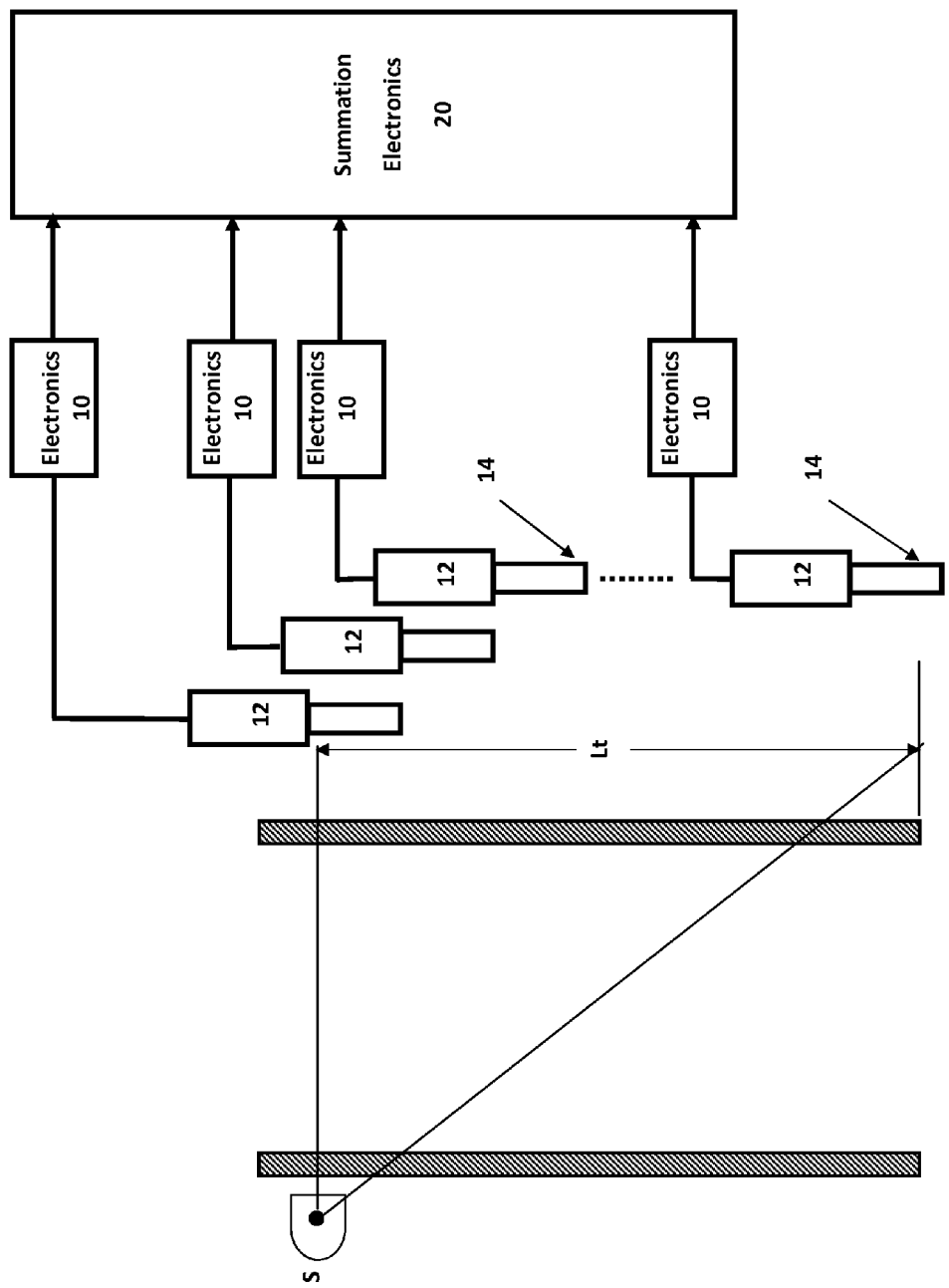
FIG. 4 illustrates a prior art nuclear level sensing gauge using a plurality of scintillating crystals arranged in a serialized fashion.
Figure 5:
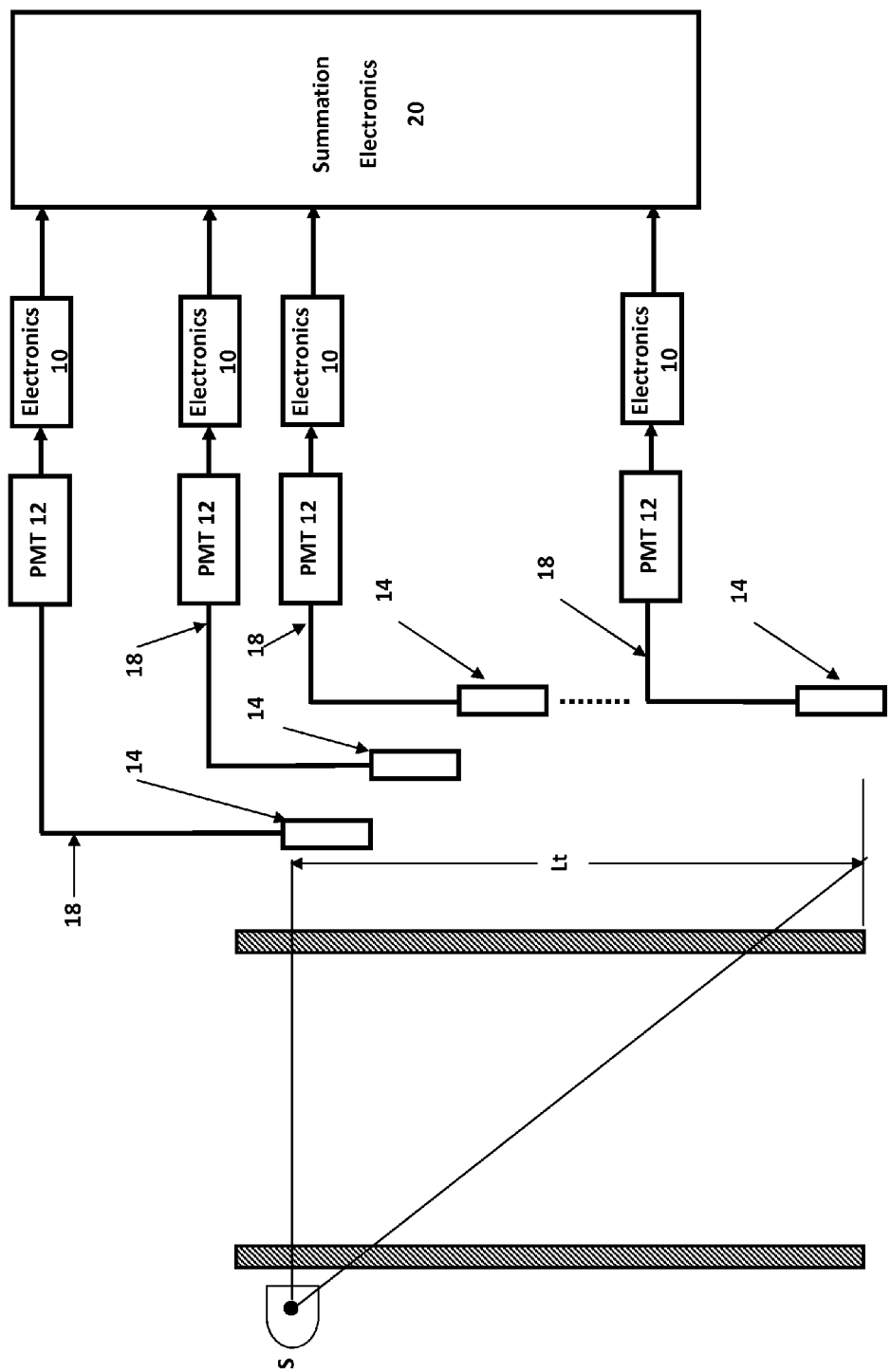
FIG. 5 illustrates a prior art nuclear level sensing gauge using a plurality of scintillating crystals arranged in serialized fashion and light guides to convey photons from the crystals to a remote PMT and electronics.

In contrast to the prior art systems shown in FIGS. 5 and 6, the invention greatly simplifies the detection of light from the scintillators by coupling the light from each scintillator via a light guide 18 to a common photomultiplier tube 12. The light guide may be of glass or acrylic/PMMA, for example, optimized for the light wavelength that is generated by the scintillators.

Thus, the invention uses multiple scintillators but simplifies the electronics by coupling light from those scintillators to a common photomultiplier tube. This simplifies the arrangement, calibration and substantially reduces the cost along with the complexity of the device.

Moreover, the use of multiple scintillators which are individual shorter than their attenuation length, improves the linearity of the response (pulse count vs. bin level) because each scintillator operates at a low attenuation level so most scintillating photos are able to emerge from the scintillator with sufficient intensity to be detected by the PMT 12 and electronics 10. By using only one PMT 12 and one set of amplifying electronics 10, the cost is substantially reduced, which may allow the device cost to reduce, or may permit the use of an even greater number of scintillators, providing a more linear response, as well as greater light yield, and as a result, better measurement resolution. Improved light yield can allow reduction in the size of the source S.

The described approach of coupling light via a light guide from multiple scintillators to a single PMT, is applicable to all types of scintillation detectors that use multiple scintillators. In each case the common PMT approach can improve performance by reducing scintillator size, yet reduce the cost through the elimination of repetitive PMT and electronics packages.

It will be appreciated that the light guides 18 deliver light to the PMT 12 at the location where the light guide is coupled to the PMT—a location that is related to the location of the scintillator in the linear stack. In some measurement applications it may be of interest which of the several scintillators produced a given light pulse; for such an application a position sensitive PMT may be used as the PMT 12. Suitable PMT's are available from Hammatsu Photonics and described in the literature.

In high radiation applications, given the number of scintillators and the relative low attenuation in the scintillators, it may be possible to sense scintillating light with a photodiode array, as there may be enough light that a photomultiplier tube is not required, thus further reducing the cost and complexity of the system for such applications.

The present invention has been described in connection with several embodiments and some of those embodiments have been elaborated in substantial detail. However, the scope of the invention is not to be limited by these embodiments which are presented as exemplary and not exclusive. The scope of the invention being claimed is set forth by the following claims.

What is claimed is:

1. A nuclear level sensing gauge for measuring the level of product in a bin, comprising:
   a source of nuclear radiation positioned adjacent the product in the bin,
   a plurality of scintillators, positioned in a serial fashion adjacent the product in the bin opposite the source of nuclear radiation such that nuclear radiation from the source impinges upon on one or more of the scintillators and causes one or more scintillators to generate scintillating light, at least one said scintillator comprising first and second components; the first component comprising a plurality of scintillating optical fiber segments, and the second component comprising a scintillating crystal, circuitry detecting scintillating light comprising a common light sensor, and a plurality of respective light guides each coupled between a respective one of the plurality of scintillators and the light sensor, conveying scintillating light generated in the respectively coupled one of the plurality of scintillators to the common light sensor and forming a light path for scintillating light from the respectively coupled scintillator that is independent of the light path formed by other light guides, whereby the number of photons generated in the scintillators is measured by the common light sensor and is representative of the level of radiation-absorbing product in the bin.

2. The nuclear level sensing gauge of claim 1 wherein a scintillator comprises a bundle of scintillating fibers.

3. The nuclear level sensing gauge of claim 1 wherein a scintillator comprises a scintillating crystal.

4. The nuclear level sensing gauge of claim 1 wherein the circuitry for detecting scintillating light photons further comprises an amplifier for amplifying the output of the common light sensor.

5. The nuclear level sensing gauge of claim 1 wherein each scintillator is less than approximately 4 feet in length.

6. The nuclear level sensing gauge of claim 1 wherein the scintillators comprise a bundle of fibers substantially one inch in diameter.

7. The nuclear level sensing gauge of claim 1 wherein the scintillators comprise a bundle of at least 300 scintillating fibers.

8. The nuclear level sensing gauge of claim 1 wherein the light sensor is a photomultiplier tube.

9. The nuclear level sensing gauge of claim 8 wherein the photomultiplier tube is position sensitive.

10. The nuclear level sensing gauge of claim 1 wherein the light sensor is a photodiode array.

11. A method for measuring the level of product in a bin, comprising:

positioning a source of nuclear radiation adjacent the product in the bin, positioning a plurality of scintillators in a serial fashion adjacent the product in the bin opposite the source of nuclear radiation such that nuclear radiation from the source impinges upon one or more of the scintillators and causes one or more scintillators to generate scintillating light, wherein each scintillator has a length less than the attenuation length of a light transmitting medium used by the scintillator, at least one said scintillator comprising first and second components; the first component comprising a plurality of scintillating optical fiber segments, and the second component comprising a scintillating crystal, and coupling scintillating light from each respective one of two more scintillators to a common light sensor via a light path formed by two ore more respective light guides, the light paths from each respective scintillator being independent of the light path from other scintillators, the light sensor detecting scintillating light generated by each of the two or more scintillators, whereby the number of photons generated in the scintillators is measured by the common light sensor and is representative of the level of radiation-absorbing product in the bin.

12. The method of claim 11 wherein a scintillator comprises a bundle of scintillating fibers.

13. The method of claim 11 wherein a scintillator comprises a scintillating crystal.

14. The method of claim 11 further comprising amplifying the output of the common light sensor with an amplifier.

15. The method of claim 11 wherein each scintillator is less than approximately 4 feet in length.

16. The method of claim 11 wherein the scintillators comprise a bundle of fibers substantially one inch in diameter.

17. The method of claim 11 wherein the scintillators comprise a bundle of at least 300 scintillating fibers.

18. The method of claim 11 wherein the light sensor is a photomultiplier tube.

19. The method of claim 18 wherein the photomultiplier tube is position sensitive.

20. The method of claim 11 wherein the light sensor is a photodiode array.

* * * * *

UNITED STATES PATENT AND TRADEMARK OFFICE
CERTIFICATE OF CORRECTION

PATENT NO. : 9,921,172 B2
APPLICATION NO. : 13/798179
DATED : March 20, 2018
INVENTOR(S) : Bonaventure Cahill et al.

It is certified that error appears in the above-identified patent and that said Letters Patent is hereby corrected as shown below:

In the Specification

Column 1, Line 39, delete: "... the radiation detector, is compared to ...", and replace it with: --...the radiation detector is compared to ...--.

Column 2, Lines 26-27, delete: "... of a medium, which is defined as distance that light that light can be transmitted through a medium before the light ...", and replace it with: --... of a medium, which is defined as distance that light can be transmitted through a medium before the light ...--.

Column 2, Line 48, delete: "... The output of the various amplifiers are then coupled to ...", and replace it with: --... The outputs of the various amplifiers are then coupled to ...--.

Column 2, Lines 59-60, delete: "... length, but have a collectively length Lt that can be substantially longer.", replace it with: --...length, but have a collective length Lt that can be substantially longer.--.

Column 4, Lines 13-14, delete: "Moreover, the use of multiple scintillators which are individual shorter than their attenuation length, improves the ...", and replace it with: --Moreover, the use of multiple scintillators which are individually shorter than their attenuation length, improves the ...--.

Column 4, Line 17, delete: "... scintillating photos are able to emerge...", and replace it with: --...scintillating photons are able to emerge--.

In the Claims

Column 4, Line 63, Claim 1, Line 8, delete: "... source impinges upon on one or more of the ...", replace it with: --...source impinges upon one or more of the ...--.

Column 6, Lines 13-15, Claim 11, Lines 17-19, delete: "...coupling scintillating light from each respective one of two more scintillators to a common light sensor via a light path, formed by two ore Signed and Sealed this
Twenty-seventh Day of August, 2019

Andrei Iancu
*Director of the United States Patent and Trademark Office* more respective light ...", and replace with: --...coupling scintillating light from each respective one of two or more scintillators to a common light sensor via a light path, formed by two or more respective light ...--.